United States Patent
Thanneeru et al.

(10) Patent No.: US 11,743,704 B2
(45) Date of Patent: Aug. 29, 2023

(54) EMERGENCY SERVICE FALLBACK BASED ON USER EQUIPMENT CAPABILITY

(71) Applicant: T-Mobile USA, Inc., Bellevue, WA (US)

(72) Inventors: Suresh Thanneeru, Redmond, WA (US); Christopher H. Joul, Bellevue, WA (US); Boris Antsev, Bothell, WA (US); William Michael Hooker, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/171,969

(22) Filed: Feb. 9, 2021

(65) Prior Publication Data

US 2021/0250745 A1    Aug. 12, 2021

Related U.S. Application Data

(60) Provisional application No. 62/975,149, filed on Feb. 11, 2020.

(51) Int. Cl.
*H04W 4/90* (2018.01)
*H04W 4/029* (2018.01)
(Continued)

(52) U.S. Cl.
CPC ............ *H04W 4/90* (2018.02); *H04W 4/029* (2018.02); *H04W 8/22* (2013.01); *H04W 60/00* (2013.01); *H04W 84/042* (2013.01)

(58) Field of Classification Search
None
See application file for complete search history.

(56) References Cited

U.S. PATENT DOCUMENTS

2020/0252849 A1* 8/2020 Tang .................. H04W 36/00
2021/0227437 A1* 7/2021 Venkataraman ...... H04W 36/14

FOREIGN PATENT DOCUMENTS

WO    WO2019075741 A1    4/2019

OTHER PUBLICATIONS

3Gpp, "Non-Access Stratum (NAS) protocpol for 5G System (5GS)", available at <<https://www.etsi.org/deliver/etsi_ts/124500_124599/124501/15.06.00_60/ts_124501v150600p.pdf>>, 3GPP TS 24.501, version 15.6.0, release 15, Jan. 2020, 491 pages.

(Continued)

*Primary Examiner* — Jinsong Hu
*Assistant Examiner* — Alexander J Yi
(74) *Attorney, Agent, or Firm* — Lee & Hayes, P.C.

(57) ABSTRACT

Techniques for handling emergency calls in a fifth generation (5G) telecommunication network are discussed herein. Some 5G-compatible user equipment (UEs) support 5G emergency calls, while other 5G-compatible UEs do not support 5G emergency calls. If a UE supports 5G emergency calls, the 5G telecommunication network may instruct the UE during network registration to use the 5G telecommunication network for any emergency calls attempted later. However, if a UE does not support 5G emergency calls, the 5G telecommunication network may instruct the UE during network registration to instead use Long-Term Evolution (LTE) emergency fallback procedures for emergency calls. Such LTE emergency fallback procedures can cause the 5G telecommunication network to steer the UE to LTE for an emergency call almost immediately after receiving a service request from the UE, even though the 5G telecommunication network itself supports emergency calls.

17 Claims, 5 Drawing Sheets

(51) Int. Cl.
    *H04W 8/22*     (2009.01)
    *H04W 60/00*     (2009.01)
    *H04W 84/04*     (2009.01)

(56) References Cited

OTHER PUBLICATIONS

3GPP, "Procedures for the 5G System (5GS)", available at <<https://www.etsi.org/deliver/etsi_ts/123500_123599/123502/15.08.00_60/ts_123502v150800p.pdf>>, 3GPP TS 23.502, version 15.8.0, release 15, Jan. 2020, 362 pages.

3GPP, "System archictecture for the 5G System (5GS)", available at <<https://www.etsi.org/deliver/etsi_ts/123500_123599/123501/15.03.00_60/ts_123501v150300p.pdf>>, 3GPP TS 23.501, version 15.8.0, release 15, Jan. 2020, 251 pages.

3GPP, "3rd Generation Partnership Project; Technical Specification Group Services and System Aspects; System Architecture for the 5G System; Stage 2 (Release 15)", TS 23.501 v15.7.0, Sep. 4, 2019, 243, pages.

Blackberry UK LTD, "Correct determination of Emergency Services Fallback support in the AMF", 3GPP Draft; C1-198236, Nov. 4, 2019, 40 pages.

The Extended European Search Report dated May 28, 2021 for European Patent Application No. 21156556.9, 11 pages.

\* cited by examiner

EMERGENCY SERVICE FALLBACK BASED ON USER EQUIPMENT CAPABILITY

RELATED APPLICATIONS

This U.S. Patent Application claims priority to U.S. Provisional Patent Application No. 62/975,149, entitled "EMERGENCY SERVICE FALLBACK BASED ON DEVICE CAPABILITY," filed on Feb. 11, 2020, the entirety of which is incorporated herein by reference.

BACKGROUND

Some early fifth generation (5G) telecommunication networks were configured to handle data transmissions, but did not support voice calls. For example, many 5G telecommunication networks were initially deployed as non-standalone (NSA) networks, which generally redirected voice calls, including emergency calls, to Long-Term Evolution (LTE) telecommunication networks or other types of networks. Some other 5G telecommunication networks, such as early 5G standalone (SA) networks, may have supported at least some types of voice calls, but may not have supported 5G emergency calls. Accordingly, many early 5G telecommunication networks were configured to redirect UEs to LTE telecommunication networks if users of the UEs dialed 9-1-1 or another emergency number. Similarly, some 5G-compatible telephones, or other 5G-compatible user equipment (UE) may have been configured to support 5G data transmissions, but not have been natively configured to support 5G voice calls or 5G emergency calls.

However, as 5G technologies have developed, some 5G telecommunication networks do now support 5G emergency calls. For example, some 5G telecommunication networks are configured to handle 5G data as well as 5G voice calls, including 5G emergency calls. Although 5G-compatible UEs that do not natively support 5G voice calls and/or 5G emergency calls may remain deployed in the field, other types of 5G-compatible UEs may also be deployed in the field that are configured to natively engage in voice calls, including emergency calls, via 5G telecommunication networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
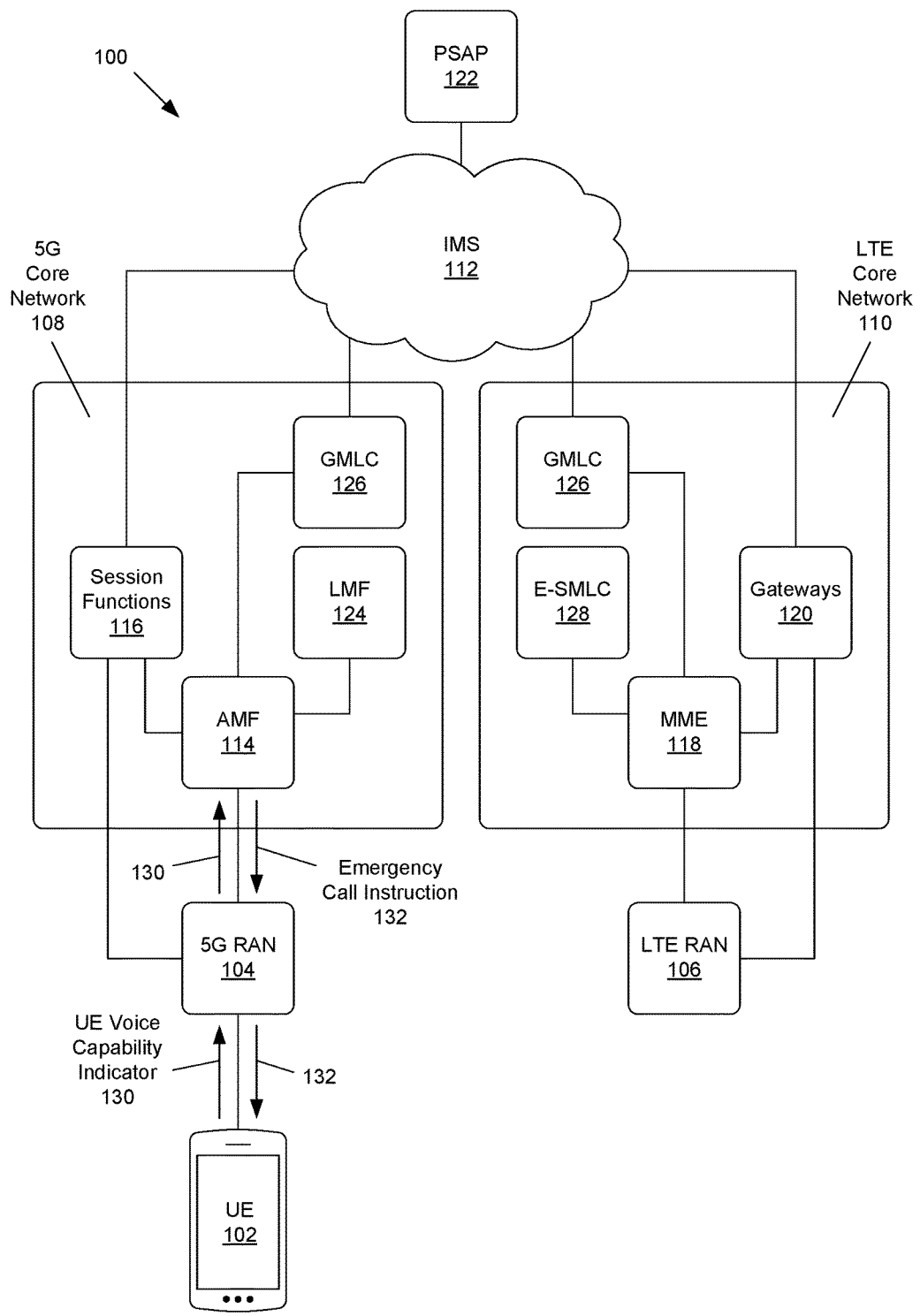
FIG. 1 shows an example network environment in which a UE can connect to a telecommunication network.

Early fifth generation (5G) telecommunication networks were configured to handle 5G data transmissions and/or some types of voice calls, but were configured to steer user equipment (UE) to Long-Term Evolution (LTE) networks for emergency calls. As an example, when a UE registered with such a 5G network, the 5G network may have provided an indication to the UE that the 5G network did not support emergency services, and/or that the UE should accordingly attempt emergency calls via fallback to an LTE network. If the UE was still attached to the 5G network when a user dialed 9-1-1 or another emergency number, the UE could follow the indication provided by the 5G network during registration, and send a service request to the 5G network that included an emergency service fallback indicator. The 5G network, based on the emergency service fallback indicator in the service request, could almost immediately return an instruction that would cause the UE to fall back to an LTE network for the emergency call. As such, the UE could set up the emergency call via the LTE network without appreciable delay, despite having been registered with the 5G network.

As 5G technology developed, some 5G networks became, or were deployed as, networks that are configured to handle both 5G data transmissions and 5G voice calls, including 5G emergency calls. Many such 5G networks are configured to inform UEs, during network registration, that the 5G networks support 5G voice calls, including 5G emergency calls. Accordingly, based on information provided by a 5G network during network registration indicating that the 5G network supports 5G voice calls, a UE may be configured to send a service request to the 5G network if the UE attempts to make an emergency call. If the UE also supports emergency calls via a connection to the 5G network, the 5G network can connect the emergency call.

However, call setup delays and other issues can arise in existing 5G networks if the 5G network does support 5G emergency calls, but the UE itself does not support 5G emergency calls. For example, if the 5G network supports 5G voice calls, in many existing systems the 5G network may be configured to inform all 5G-compatible UEs that the 5G network supports 5G voice calls. This may be appropriate for UEs that do natively support 5G voice calls, as the UEs can follow the indication from the 5G network to initiate voice calls via the 5G network, including emergency calls. However, the 5G network informing UEs that the 5G network itself supports 5G emergency calls may create issues for UEs that themselves do not natively support 5G voice calls.

For example, a particular UE may support 5G data transmissions, but may not natively support 5G emergency calls or 5G voice calls in general. If such a UE connects to a 5G network, the 5G network may inform the UE during network registration that the 5G network supports 5G voice calls and/or 5G emergency calls. If the UE then attempts to make an emergency call, the UE may be configured to follow the indication that the 5G network supports 5G emergency calls, provided to the UE during network registration, and send a service request to the 5G network that omits an emergency service fallback indicator. In this situation, because the 5G network supports 5G emergency calls, and the service request from the UE does not include an emergency service fallback indicator, the 5G network may not immediately steer the UE to LTE, as earlier 5G networks that did not support 5G emergency calls would have done in response to an emergency service fallback indicator. Instead, the 5G network may respond to the service request by performing one or more call setup operations. For example, the 5G network may begin initiating a data session for the UE in the 5G network, begin setting up a communication session with an Internet Protocol (IP) Multimedia Subsystem (IMS) for the emergency call, begin attempting to determine a location of the UE, and/or begin performing other call setup operations.

The 5G network may not determine until relatively late in the call setup process that, although the 5G network supports 5G emergency calls, the UE itself does not support 5G emergency calls. At that point, the 5G network can steer the UE to an LTE network, where call setup procedures can be continued or restarted. For example, the LTE network may set up a different data session for the UE, attempt to transfer an IMS communication session to the LTE network, and/or restart attempts to determine a location of the UE. In some examples, location data already determined by the 5G network about the location of the UE may be lost when the UE is steered to the LTE network and location determination services are restarted in the LTE network. Additionally, performing some call setup procedures in the 5G network before discovering that the UE does not support 5G emergency, and then repeating similar call setup procedures in the LTE network, can lead to call setup delays, an inefficient use of computing resources in the 5G network and LTE network, and/or other issues. Issues such as lost location data and call setup delays may be particularly significant in emergency situations, for instance if the UE has moved and is in a different location by the time the LTE network determines the location of the UE, or if call setup delays lead to a delay in providing emergency services to a caller.

The systems and methods described herein can avoid such lost location data, call setup delays, and/or other issues associated with an emergency call attempted by a 5G-compatible UE. A 5G network that does support 5G voice calls, including 5G emergency calls, can instruct a UE to attempt emergency calls via either the 5G network or via a fallback to an LTE network, based on the capabilities of the UE itself rather than the capabilities of the 5G network. For example, if the UE indicates that the UE also supports 5G emergency calls, the 5G network can instruct the UE to attempt emergency calls via the 5G network.

However, if the UE instead indicates that the UE does not support 5G emergency calls, the 5G network can instruct the UE to include an emergency service fallback indicator in a service request for an emergency call. If the 5G network receives a service request from a UE that includes the emergency service fallback indicator, based on an instruction the 5G network provided during network registration because the UE does not support 5G emergency calls, the 5G network can almost immediately steer the UE to an LTE network to attempt the emergency call. As such, the 5G network can avoid initiating location service operations, session setup operations, and/or performing other call setup operations in the 5G network before later steering the UE to the LTE network. The 5G network can instead almost immediately steer the UE to the LTE network to engage in the emergency call, such that the LTE network can more quickly initiate location services, set up data connections, and perform other call setup operations.

Example Environment

FIG. 1 shows an example network environment 100 in which a UE 102 can connect to a telecommunication network to engage in communication sessions for voice calls, video calls, messaging, data transfers, and/or any other type of communication. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The UE 102 and/or the telecommunication network can be compatible with multiple types of radio access technologies, wireless access technologies, protocols, and/or standards. For example, the UE 102 and the telecommunication network can be compatible with fifth generation (5G) New Radio (NR) technology, as well as Long-Term Evolution (LTE)/LTE Advanced technology or other fourth generation (4G) technology. In some examples, the UE 102 and/or the telecommunication network may also be compatible with other types of radio access technologies, such as High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology or wireless access technology.

The telecommunication network can include different radio access networks (RANs) based on different generations of radio access technologies, including a 5G RAN 104 and an LTE RAN 106. The UE 102 may be configured to wirelessly connect to base stations or other access points in either, or both, the 5G RAN 104 and the LTE RAN 106. In some examples, the LTE RAN 106 may be known as an Evolved UMTS Terrestrial Radio Access Network (E-UTRAN). Base stations in the LTE RAN 106 may be known as evolved Node Bs (eNBs), while base stations in the 5G RAN 104 may be known as gNBs.

The telecommunication network can also include different core networks based on different generations of radio access technologies, including a 5G core network 108 and an LTE core network 110. In some examples, the LTE core network 110 can be an LTE packet core network known as an Evolved Packet Core (EPC). In some examples, the 5G RAN 104 and the 5G core network 108 may together be known as a 5G network, while the LTE RAN 106 and the LTE core network 110 may together be known as an LTE network. When the UE 102 is connected to either the 5G network or the LTE network, the 5G core network 108 or the LTE core network 110 may connect the UE 102 to other data networks, such as the Internet or an Internet Protocol (IP) Multimedia Subsystem (IMS) 112.

The 5G core network 108 may have a service-based architecture that includes multiple types of network functions that process control plane data and/or user plane data to implement services for the UE 102. Network functions of the 5G core network 108 can include an Access and Mobility Management Function (AMF) 114. Network functions of the 5G core network 108 can also include session functions 116, such as Session Management Functions (SMFs) and User Plane Functions (UPFs). In some examples, the 5G core network 108 can also include other types of network functions and elements not shown in FIG. 1, such as a Policy Control Function (PCF), Authentication Server Function (AUSF), Network Repository Function (NRF), Unified Data Management (UDM), and/or other network functions.

In the 5G core network 108, the AMF 114 may receive a Protocol Data Unit (PDU) session establishment request from the UE 102, and cause other elements of the 5G core network 108 to set up a PDU session in response to the PDU session establishment request. For example, if the AMF 114 receives a PDU session establishment request from the UE 102 via the 5G RAN 104, the AMF 114 may select a particular SMF to handle the PDU session establishment request. The SMF may create a PDU session for the UE 102 in response to the PDU session establishment request, and may manage the PDU session in conjunction with a UPF.

The LTE core network 110 may also set up and manage connections for the UE 102. The LTE core network 110 can include a Mobility Management Entity (MME) 118 and gateways 120, such as Serving Gateways (SGWs) and Packet Data Network (PDN) Gateways (PGWs). The LTE core network 110 may also include other elements not shown in FIG. 1, such as a Home Subscriber Server (HSS), a Policy and Charging Rules Function (PCRF), and/or other network elements.

In the LTE core network 110, the MME 118 may receive a PDN connectivity request from the UE 102, and cause other elements of the LTE core network 110 to set up a PDN connection in response to the PDN connectivity request. For example, if the MME 118 receives a PDN connectivity request from the UE 102 via the LTE RAN 106, the MME 118 may cause a bearer for a PDN connection to be established between the UE 102, an SGW, and a PGW.

The IMS 112 may be configured to manage communication sessions for the UE 102, including sessions for voice calls, video calls, and/or other types of communications. Data for a communication session managed by the IMS 112 for the UE 102 may be transported via a PDU session established for the UE 102 in the 5G core network 108, or via a PDN connection established for the UE 102 in the LTE core network 110.

In some situations, the UE 102 may attempt to make an emergency call via the telecommunication network. For example, a user in the United States may dial 9-1-1 via the UE 102 to initiate an emergency call, while a user in Europe may dial 9-9-9, 1-1-2, or another emergency number to initiate an emergency call. In these situations, the IMS 112 may assist with connecting the emergency call to a public-safety answering point (PSAP) 122. An operator at the PSAP 122 may answer the emergency call and deploy police resources, fire department resources, ambulances, and/or other emergency response resources to assist the caller.

The IMS 112, and/or the 5G core network 108 or the LTE core network 110, may use location services (LCS) when connecting an emergency call for the UE 102. For example, LCS data can identify or estimate a location of the UE 102. Accordingly, the IMS 112, and/or the 5G core network 108 or the LTE core network 110, can select a particular PSAP associated with the location of the UE 102, and connect the UE 102 to that particular PSAP.

The 5G core network 108 may have LCS architecture that includes a location management function (LMF) 124 and/or a Gateway Mobile Location Centre (GMLC) 126 linked to the AMF 114. The LMF 124 may be configured to determine a location of the UE 102, based on a request from the AMF 114. In some examples, the LMF 124 may obtain signal strength measurements or other positioning measurements from the 5G RAN 104, identities and locations of gNBs in the 5G RAN 104 the UE 102 is or has been connected to, and/or other information, which the LMF 124 can use to at least estimate the location of the UE 102.

In some examples, the GMLC 126 may receive a request for location data associated with the UE 102 from the IMS 112, and can request such location data from the AMF 114. In turn, the AMF 114 can cause the LMF 124 to determine the location of the UE for the IMS 112, and the AMF 114 may return the location data to the GMLC 126 and IMS 112. In other examples, the AMF 114 may itself determine to request location data associated with the UE 102 from the LMF 124.

The LTE core network 110 may have LCS architecture that includes an Evolved Serving Mobile Location Center (E-SMLC) 128 and/or a GMLC 126 linked to the MME 118. The E-SMLC 128 may be configured to determine a location of the UE 102, based on a request from the MME 118. In some examples, the E-SMLC 128 may obtain signal strength measurements or other positioning measurements from the LTE RAN 106, identities and locations of eNBs in the LTE RAN 106 the UE 102 is or has been connected to, and/or other information, which the E-SMLC 128 can use to at least estimate the location of the UE 102.

In some examples, the 5G core network 108 and the LTE core network 110 may share a common GMLC 126. In other examples, the 5G core network 108 and the LTE core network 110 may have distinct GMLCs. A GMLC 126 associated with the LTE core network 110 may receive a request for location data associated with the UE 102 from the IMS 112, and can request such location data from the MME 118. In turn, the MME 118 can cause the E-SMLC 128 to determine the location of the UE for the IMS 112, and the MME 118 may return the location data to the GMLC 126 and IMS 112. In other examples, the MME 118 may itself determine to request location data associated with the UE 102 from the E-SMLC 128.

In some examples, the LMF 124 of the 5G core network 108 may interface with the E-SMLC 128 of the LTE core network 110, such that the LMF 124 and the E-SMLC 128 can obtain measurements or other location data from each other. For example, the LMF 124 of the 5G core network 108 may, via the E-SMLC 128, obtain signal strength information or other positioning data associated with the UE 102 and the LTE RAN 106, which the LMF 124 may use to help determine the location of the UE 102.

The 5G network may be configured to handle 5G emergency calls, for instance by connecting emergency calls to PSAPs. However, the UE 102 itself may or may not be configured to make emergency calls via the 5G network. For example, because some early 5G networks only supported 5G data transmissions and did not support 5G voice calls, some 5G UEs may be designed to support 5G data connections, but rely on LTE connections for voice calls. Accordingly, some 5G UEs may support 5G data, but not 5G voice calls. Such 5G UEs may not support any type of voice call via the 5G network, including 5G emergency calls. Other 5G UEs may support some types of 5G voice calls, but not 5G emergency calls. Still other 5G UEs may support making all voice calls, including emergency calls, via the 5G network.

Accordingly, although the 5G network shown in FIG. 1 can itself support both 5G data and 5G voice calls, including 5G emergency calls, a mixture of 5G UEs with different capabilities may connect to the 5G network. This mixture of 5G UEs may include some 5G UEs that do natively support 5G emergency calls, and other 5G UEs that do not natively support 5G emergency calls.

When the UE 102 connects to the 5G RAN 104 during an initial network registration, the UE 102 can provide a UE voice capability indicator 130 to the 5G RAN 104. The 5G RAN 104 can forward the UE voice capability indicator 130 to the AMF 114 in the 5G core network 108.

The UE voice capability indicator 130 can directly or indirectly indicate whether the UE 102 does, or does not, support 5G emergency calls. In some examples, the UE voice capability indicator 130 may be part of device radio capability information provided by the UE 102 to the 5G RAN 104 during network registration, for instance in a Radio Resource Control (RRC) message or another type of message.

In some examples, the UE voice capability indicator 130 may indicate a binary value or other types of value that identifies whether the UE 102 supports 5G voice calls, including 5G emergency calls. For instance, in these examples, the UE voice capability indicator 130 may indicate that the UE 102 supports all types of 5G voice calls (and thus supports 5G emergency calls), or that the UE 102 does not support any type of 5G voice call (and thus does not support 5G emergency calls).

In other examples, the UE voice capability indicator 130 may indicate a binary value or other type of value that more specifically identifies whether the UE 102 supports 5G emergency calls. For instance, in these examples, the UE voice capability indicator 130 may indicate specifically that the UE 102 supports 5G emergency calls, or that the UE 102 does not support 5G emergency calls (regardless of whether the UE 102 does or does not support other types of 5G voice calls).

The AMF 114 can receive the UE voice capability indicator 130 from the 5G RAN 104 during initial network registration for the UE 102. The AMF 114 can determine, based on the UE voice capability indicator 130, whether the UE 102 itself supports 5G emergency calls. The AMF 114 can return an emergency call instruction 132 to the UE 102, via the 5G RAN 104, as part of the initial network registration for the UE 102. In some examples, the emergency call instruction 132 can be, or be included in, a Non-Access Stratum (NAS) message returned to the UE 102 during network registration. The emergency call instruction 132 can indicate, to the UE 102, whether the UE 102 should attempt emergency calls via the 5G network or whether the UE 102 should attempt emergency calls via LTE emergency fallback procedures.

If the UE voice capability indicator 130 indicates that the UE 102 does support 5G emergency calls, in some examples the emergency call instruction 132 can be provided as an "emergency service support indicator for 3GPP access" defined in 3GPP TS 24.501, known as an "EMC" indicator. The EMC indicator can be one or more bits, flags, or other values that indicate, to the UE 102, that the 5G network does support 5G emergency calls. If the UE 102 later attempts to make an emergency call, the UE 102 can follow the EMC indicator provided during network registration to have the emergency call established via the 5G network. This situation is shown and described in more detail below with respect to FIG. 2.

If the UE voice capability indicator 130 instead indicates that the UE 102 does not support 5G emergency calls, in some examples the emergency call instruction 132 can be provided as an "emergency services fallback indicator for 3GPP access" defined in 3GPP TS 24.501, known as an "EMF" indicator. The EMF indicator can be one or more bits, flags, or other values that represent, to the UE 102, that the 5G network does not support 5G emergency calls. Although the 5G network may actually support 5G emergency calls as discussed above, in this situation the EMF indicator provided in the emergency call instruction 132 can indicate to the UE 102 that the UE 102 should use LTE emergency fallback procedures if the UE 102 later attempts to make an emergency call. Such LTE emergency fallback procedures can cause the 5G network to, upon receipt of a service request associated with an emergency call, almost immediately redirect the UE 102 to the LTE network to set up the emergency call. This situation is shown and described in more detail below with respect to FIG. 3.

Accordingly, although the 5G network can support 5G emergency calls, the 5G network may vary the emergency call instruction 132 returned to the UE 102 based on the capabilities of the UE 102, not based on the capabilities of the 5G network. As such, the same 5G network can represent to different UEs that the 5G network does, or does not, support 5G emergency calls based on whether the different UEs themselves support 5G emergency calls.

Instructing a UE 102 that does not support 5G emergency calls to use LTE emergency fallback procedures can avoid call setup delays and other issues that might otherwise occur if the UE 102 is informed that the 5G network supports 5G emergency calls based solely on the capabilities of the 5G network itself. For example, if a UE that does not support 5G emergency calls were instructed to use the 5G network for emergency calls because the 5G network itself supports 5G emergency calls, setup of an emergency call may proceed in the 5G core network 108 for a period of time before an element of the 5G network determines that the UE 102 is not capable of engaging in emergency calls via the 5G network. This can lead to call setup delays, repeated operations, lost location data, and/or other issues.

For instance, if a UE that does not support 5G emergency calls is instructed to attempt emergency calls via the 5G network because the 5G network itself supports 5G emergency calls, session functions 116 may begin setting up a PDU session for the UE 102, the LMF 124 may begin attempting to determine a location of the UE 102, and/or the IMS 112 may begin setting up a communication session for the emergency call through the 5G core network 108. However, when the AMF 114, the 5G RAN 104, or another element of the 5G network later determines that the UE 102 does not support 5G emergency calls, the 5G network can steer the UE 102 to the LTE network, and the UE 102 can continue or restart setup of the emergency call via the LTE network. However, in this situation the LTE network may need to repeat and/or restart many call setup operations already performed by the 5G network, and/or attempt to resume procedures that were initiated by the 5G network. For instance, the LTE network may attempt to resume session establishment procedures that the 5G network had previously been performing by establishing a PDN connection for the UE 102 in the LTE network. Similarly, the E-SMLC 128 may determine a location of the UE 102, even if the LMF 124 in the 5G network had already started determining the location of the UE 102. Accordingly, location data associated with the UE 102, which may in some cases be critical during emergency situations, that had been determined by the 5G network may be lost or take time to transfer to the LTE network. Additionally, if the IMS 112 already began setting up a communication session for the UE 102 based on call setup operations performed in the 5G network, the IMS 112 may not be aware that the UE 102 has been steered to the LTE network.

Figure 2:
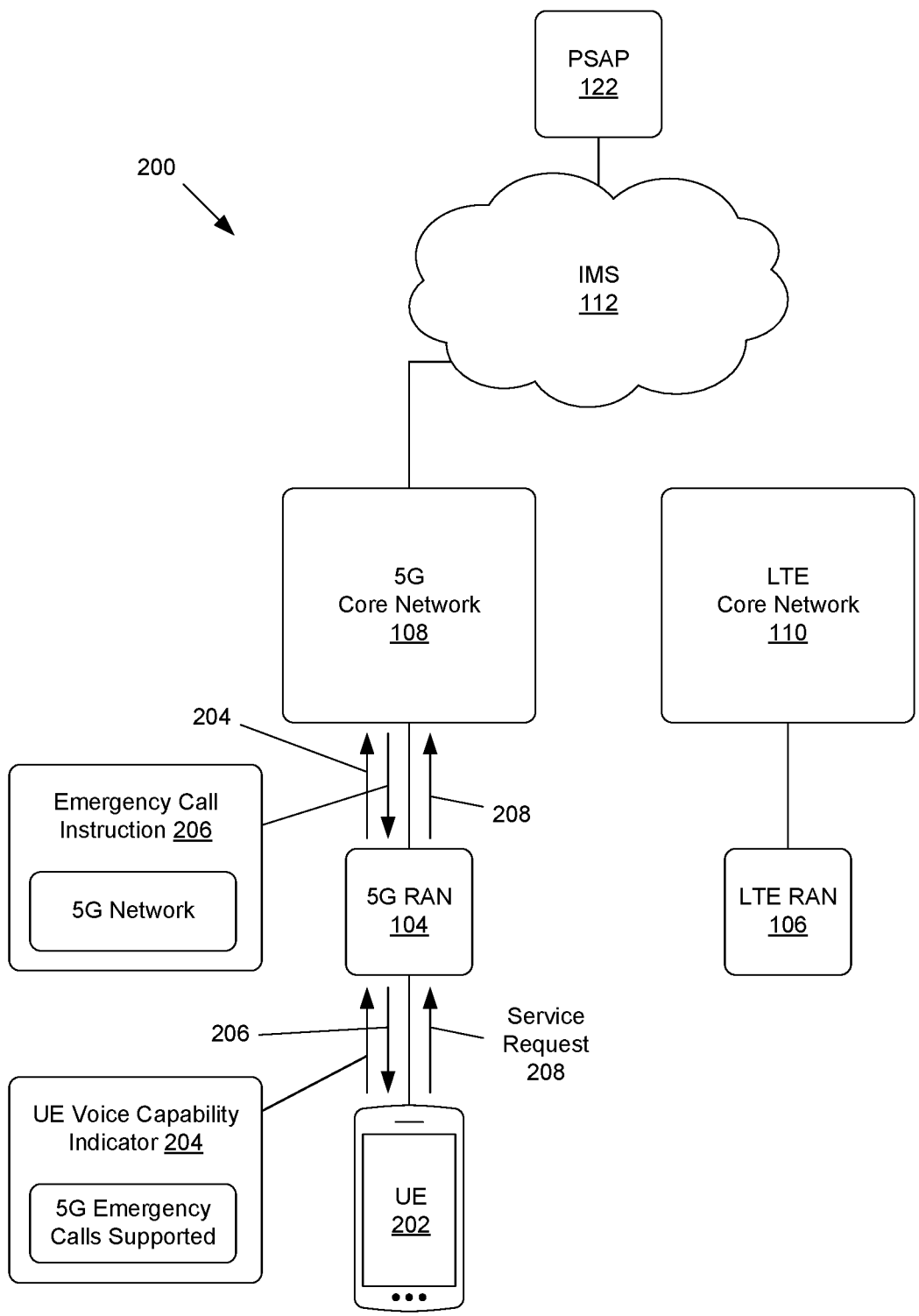
FIG. 2 shows an example in which a UE does support 5G voice calls, including 5G emergency calls.
Figure 3:
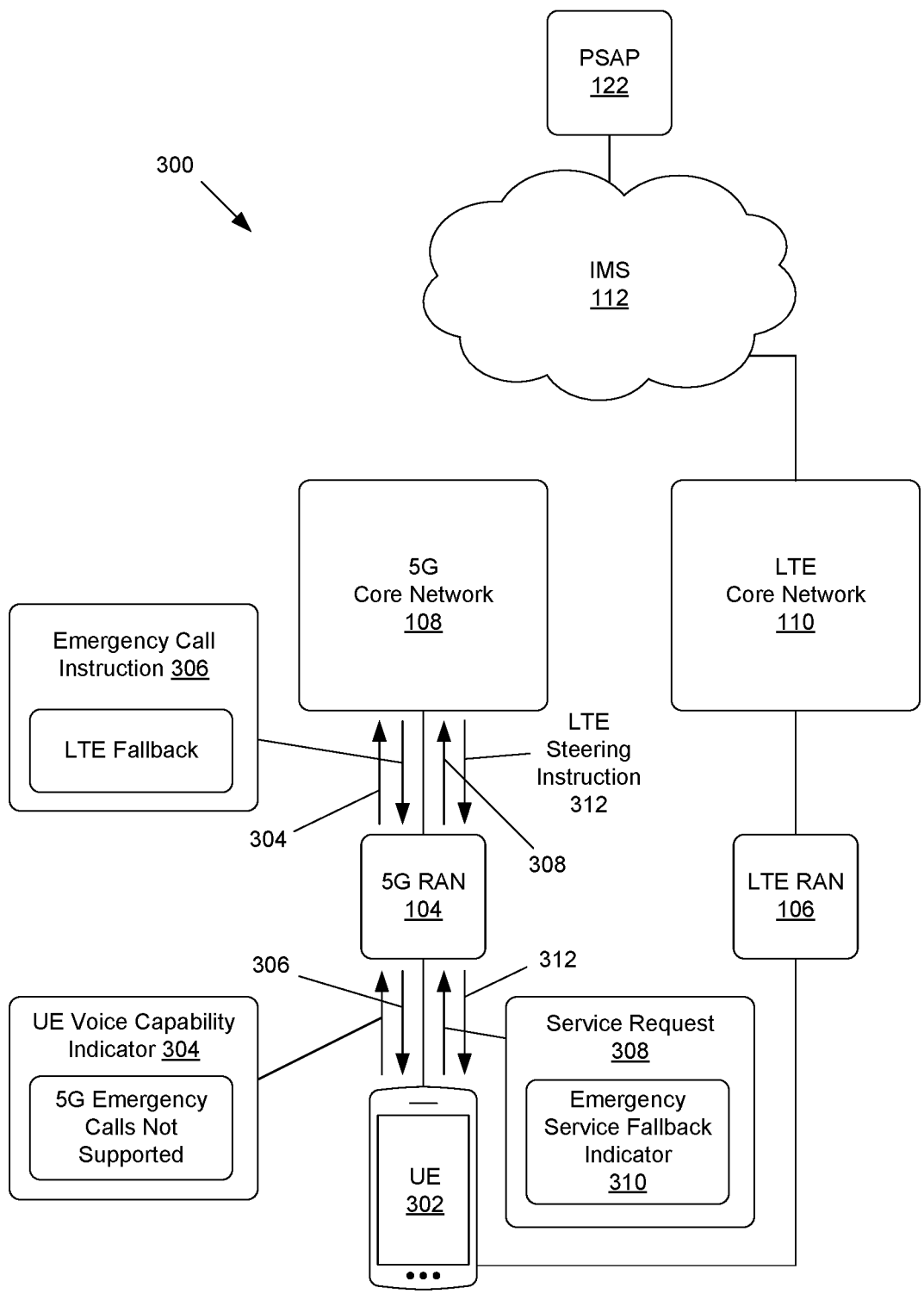
FIG. 3 shows an example in which a UE does not support 5G emergency calls.

However, such call setup delays, lost location data, and/or other issues can be avoided by the AMF 114 returning an emergency call instruction 132 to the UE 102 during network registration based on whether the UE 102 itself does, or does not, support 5G emergency calls. For example, if the UE 102 and the 5G network both support 5G emergency calls, the AMF 114 can provide an emergency call instruction 132 to the UE 102 that causes the UE 102 to set up emergency calls via the 5G network as shown in FIG. 2. However, if instead the UE 102 does not support 5G emergency calls, the AMF 114 can provide an emergency call instruction 132 to the UE 102 that causes the UE 102 to use LTE emergency fallback procedures as shown in FIG. 3. Using LTE emergency fallback procedures, the UE 102 can signal to the 5G network that the 5G network should redirect the UE 102 to the LTE network to set up an emergency call, before PDU session setup operations, location services operations, IMS operations, or any other call setup operations are performed in association with the 5G network. Accordingly, call setup operations for the emergency call can proceed almost immediately in the LTE network, without similar call setup operations being performed first in the 5G network.

FIG. 2 shows an example 200 in which a UE 202 does support 5G voice calls, including 5G emergency calls. During network registration, the UE 202 may send a UE voice capability indicator 204 to the 5G RAN 104 that indicates that the UE 202 supports 5G emergency calls. The 5G RAN 104 can provide the UE voice capability indicator 204, indicating that the UE 202 supports 5G emergency calls, to the AMF 114 in the 5G core network 108.

In some examples, the UE voice capability indicator 204 may indicate that the UE 202 supports all 5G voice calls, including 5G emergency calls. In other examples, the UE voice capability indicator 204 may indicate that the UE 202 specifically supports 5G emergency calls.

As part of the network registration process, the AMF 114 can return an emergency call instruction 206 to the UE 202 via the 5G RAN 104. The emergency call instruction 206 returned by the AMF can instruct the UE 202 to use the 5G network for emergency calls. The AMF 114 can determine to return the emergency call instruction 206, which instructs the UE 202 to use the 5G network for emergency calls, based on the UE voice capability indicator 204 indicating that the UE 202 supports 5G emergency calls.

In some examples, the emergency call instruction 206 can be provided by the AMF 114 to the UE 202 as an EMC indicator. As discussed above, an EMC indicator can indicate, to the UE 202, that the 5G network does support 5G emergency calls.

After network registration, the UE 202 may attempt to make an emergency call. For example, the UE 202 may attempt to make an emergency call if a user of the UE 202 dials 9-1-1 or another emergency number. To initiate the emergency call, the UE 202 can send a service request 208 to the AMF 114 in the 5G core network 108, via the 5G RAN 104. The service request 208 may be a PDU session establishment request, or other type of service request or session request.

The service request 208 sent by the UE 202 in example 200 may lack an emergency service fallback indicator, because the 5G core network 108 previously sent the emergency call instruction 206 during network registration that instructed the UE 202 to use the 5G network for emergency calls. For example, the emergency call instruction 206 provided during network registration may have been an EMC indicator that configured the UE 202 to send the service request 208 without an emergency service fallback indicator.

In response to the service request 208, and because both the 5G network and the UE 202 supports 5G emergency calls, the 5G network can perform call setup operations and connect an emergency call between the UE 202 and the PSAP 122. For example, the 5G core network 108 can initiate a PDU session for the UE 202, the AMF 114 can request that the LMF 124 determine or estimate a location of the UE 202, the IMS 112 can establish and manage a communication session for the emergency call that routes data through the 5G core network 108, and/or the 5G network can perform other call setup and management operations associated with the emergency call. Accordingly, in example 200, the emergency call for the UE 202 can be connected via the 5G network, and the 5G network may not steer the UE 202 to the LTE network for the emergency call.

FIG. 3 shows an example 300 in which a UE 302 does not support 5G emergency calls. During network registration, the UE 302 may send a UE voice capability indicator 304 to the 5G RAN 104 that indicates that the UE 302 does not support 5G emergency calls. The 5G RAN 104 can provide the UE voice capability indicator 304, indicating that the UE 302 does not support 5G emergency calls, to the AMF 114 in the 5G core network 108.

In some examples, the UE voice capability indicator 304 may indicate that the UE 302 does not support any 5G voice calls, and thus does not support 5G emergency calls. In other examples, the UE voice capability indicator 304 may indicate that the UE 302 specifically does not support 5G emergency calls, regardless of whether the UE 302 supports other types of 5G voice calls.

As part of the network registration process, the AMF 114 can return an emergency call instruction 306 to the UE 302 via the 5G RAN 104. The emergency call instruction 306 returned by the AMF can instruct the UE 302 to use LTE emergency fallback procedures for emergency calls. The AMF 114 can determine to return the emergency call instruction 306, which instructs the UE 302 to use LTE emergency fallback procedures for emergency calls, based on the UE voice capability indicator 304 indicating that the UE 202 does not support 5G emergency calls.

In some examples, the emergency call instruction 306 can be provided by the AMF 114 to the UE 302 as an EMF indicator. As discussed above, an EMC indicator can represent, to the UE 302, that the 5G network does not support 5G emergency calls. Although the 5G network may actually support 5G emergency calls, the 5G network can nevertheless provide the UE 302 with an EMF indicator in order to cause the UE 302, which itself does not support 5G emergency calls, to use LTE emergency fallback procedures for any emergency calls that are attempted after the UE 302 registers with the 5G network.

After network registration, the UE 302 may attempt to make an emergency call. For example, the UE 302 may attempt to make an emergency call if a user of the UE 302 dials 9-1-1 or another emergency number. To initiate the emergency call, the UE 302 can send a service request 308 to the AMF 114 in the 5G core network 108, via the 5G RAN 104. The service request 308 may be a PDU session establishment request, or other type of service request or session request.

Unlike the service request 208 in example 200, the service request 308 sent by the UE 302 in example 300 may include an emergency service fallback indicator 310. The emergency service fallback indicator 310 may be a flag, value, or other data in the service request 308 that indicates, to one or more elements of the 5G network, that the 5G network should not perform call setup operations for the UE 302, and that the 5G network should instead steer the UE 302 to the LTE network for the emergency call.

The UE 302 may include the emergency service fallback indicator 310 in the service request 308 because the 5G core network 108 previously sent the emergency call instruction 306 during network registration that instructed the UE 302 to use LTE emergency fallback procedures for emergency calls. For example, the emergency call instruction 306 provided during network registration may have been an EMF indicator that configured the UE 302 to send the service request 308 with the emergency service fallback indicator 310.

In response to the service request 308, which includes the emergency service fallback indicator 310, the 5G network can avoid performing call setup operations that attempt connect an emergency call between the UE 302 and the PSAP 122 via the 5G network. Instead, although the 5G network supports 5G emergency calls, the 5G network can return an LTE steering instruction 312 to the UE 302 in response to the service request 308. The 5G network can almost immediately return the LTE steering instruction 312 to the UE 302 in response to the service request 308, based on the presence of the emergency service fallback indicator 310 in the service request 308.

The LTE steering instruction 312 can cause the UE 302 to connect to the LTE RAN 106, if the UE 302 was not already simultaneously connected to the LTE RAN 106, and to request that the LTE network set up an emergency call for the UE 302. The LTE network may accordingly initiate call setup operations, such as creating a PDN connection for the UE 302, determining or estimating a location of the UE 302 using the E-SMLC 128, causing the IMS 112 to establish and manage a communication session for the emergency call that routes data through the LTE core network 110, and/or performing any other call setup and management operations associated with the emergency call.

Accordingly, in example 300, the emergency call for the UE 302 can be connected to the PSAP 122 via the LTE network. By steering the UE 302 to the LTE network almost immediately in response to the emergency service fallback indicator 310, the 5G network can avoid initiating LCS operations and other call setup operations in the 5G network, later determining based on other data that the UE 302 does not support 5G emergency calls, and then steering the UE 302 to the LTE network where similar LCS operations and call setup operations might be repeated. As such, even though the 5G network supports 5G emergency calls, providing an EMF indicator or other emergency call instruction 306 directing the UE 302 to use LTE emergency fallback procedures, because the UE 302 itself does not support 5G emergency calls, can avoid call setup delays, lost LCS data, and/or repeated operations in both the 5G network and the LTE network.

Example Architecture

Figure 4:
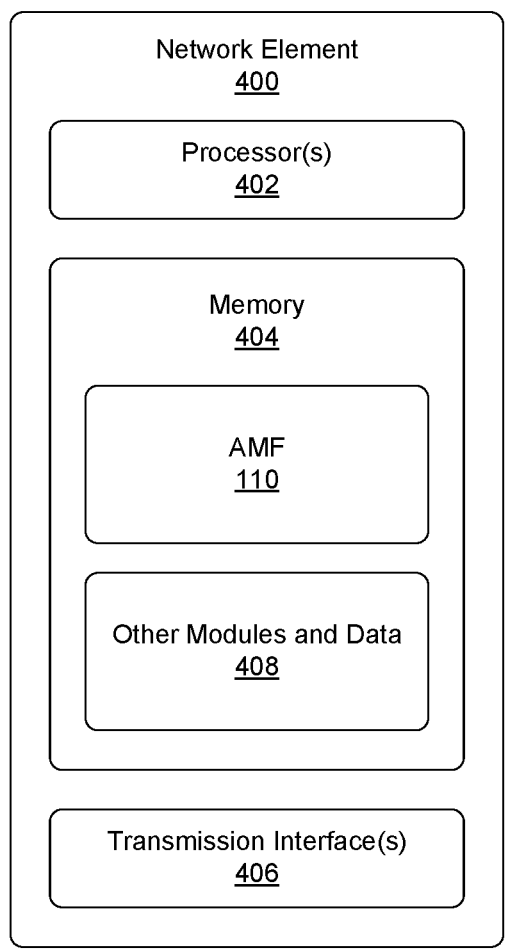
FIG. 4 shows an example system architecture for a network element configured to execute an Access and Mobility Management Function (AMF) in a 5G core network.

FIG. 4 shows an example system architecture for a network element 400 configured to execute the AMF 114 in the 5G core network 108, in accordance with various examples. As shown, the network element 400 can include processor(s) 402, memory 404, and transmission interface(s) 406. In some examples, the network element 400 can be distinct hardware for the AMF 114. However, in other examples, the network element 400 can be a server or other computing device that executes the AMF 114 as a software application or executes a virtual instance of the AMF 114.

In various examples, the processor(s) 402 can be a CPU, a GPU, both CPU and GPU, or any other type of processing unit. Each of the one or more processor(s) 402 may have numerous ALUs that perform arithmetic and logical operations, as well as one or more CUs that extract instructions and stored content from processor cache memory, and then executes these instructions by calling on the ALUs, as necessary, during program execution. The processor(s) 402 may also be responsible for executing all computer-executable instructions and/or computer applications stored in the memory 404.

In various examples, the memory 404 can include system memory, which may be volatile (such as RAM), non-volatile (such as ROM, flash memory, etc.) or some combination of the two. The memory 404 can also include additional data storage devices (removable and/or non-removable) such as, for example, magnetic disks, optical disks, or tape. Memory 404 can further include non-transitory computer-readable media, such as volatile and nonvolatile, removable and non-removable media implemented in any method or technology for storage of information, such as computer-readable instructions, data structures, program modules, or other data. For example, the memory 404 can store software or firmware elements, such as computer-readable instructions that are executable by the one or more processors 402. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by the network element 400. Any such non-transitory computer-readable media may be part of the network element 400.

The memory 404 can store computer-readable instructions and/or other data associated with operations of the network element 400, including operations of the AMF 114 described herein. For example, the memory 404 can store computer-readable instructions by which the AMF 114 can evaluate a UE voice capability indicator sent by a UE, and to vary the emergency call instruction returned to the UE during network registration based on whether the UE voice capability indicator indicates that the UE does, or does not, support 5G emergency calls. The memory 404 can further store other modules and data 410, which can be utilized by the network element 400 to perform or enable performing any action taken by the network element 400. The modules and data 410 can include a platform, operating system, firmware, and/or applications, and data utilized by the platform, operating system, firmware, and/or applications.

The transmission interface(s) 406 can include one or more modems, receivers, transmitters, antennas, error correction units, symbol coders and decoders, processors, chips, application specific integrated circuits (ASICs), programmable circuit (e.g., field programmable gate arrays), firmware components, software components, and/or other components through which the AMF 114 can send data to, and/or receive data from, other network elements, other network functions, the 5G RAN 104, and/or UEs. For example, the network element 400 can use transmission interface(s) 406 to, via the 5G RAN 104, receive the UE voice capability indicator 130 from the UE 102 and return the corresponding emergency call instruction 132 to the UE 102.

Example Operations

Figure 5:
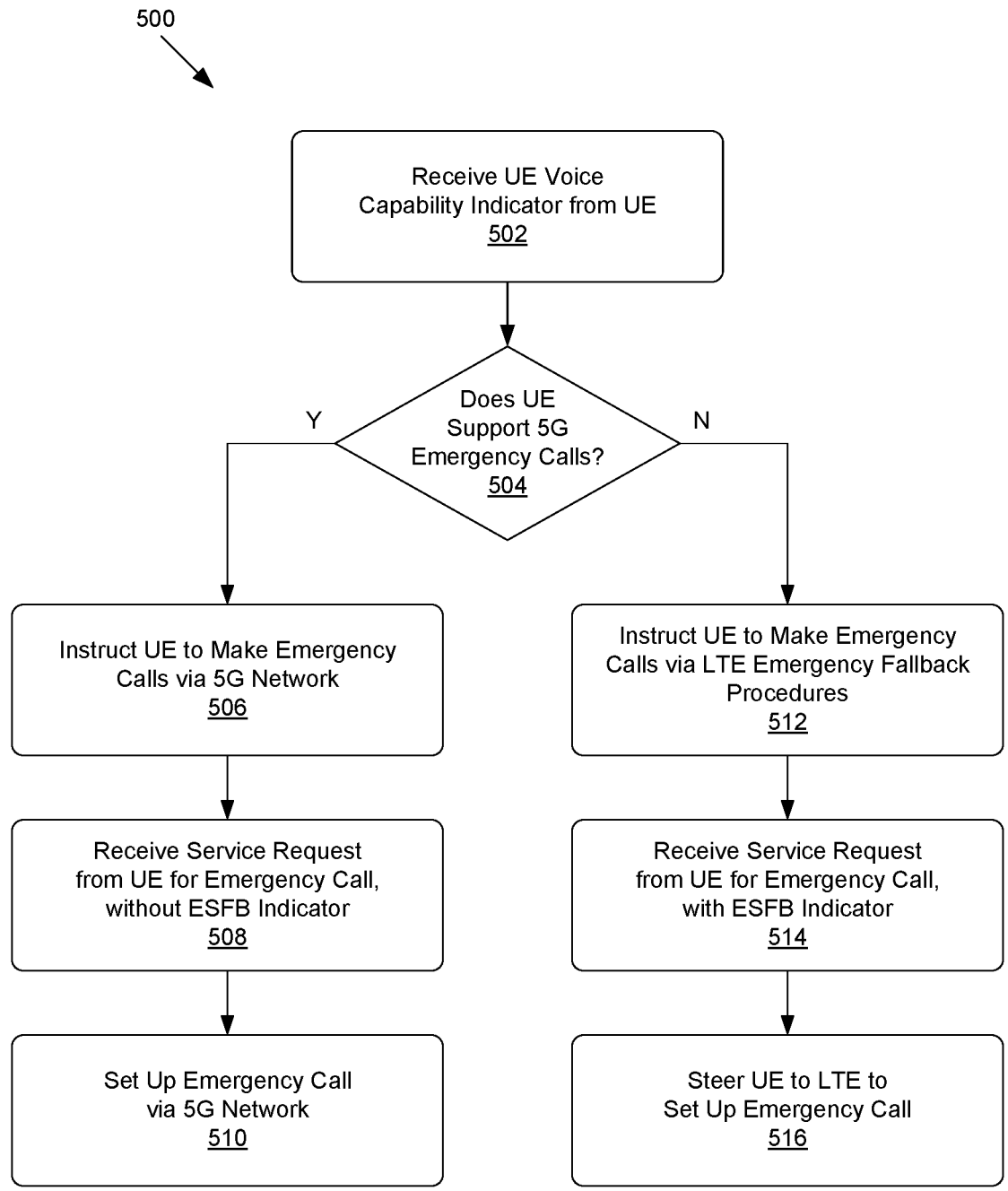
FIG. 5 shows a flowchart of an example method by which the AMF can determine which emergency call instruction to return to a UE, based on capabilities of the UE.

FIG. 5 shows a flowchart of an example method 500 by which the AMF 114 can determine which emergency call instruction to return to a UE, based on capabilities of the UE.

At block 502, the AMF 114 can receive a UE voice capability indicator from the UE. The UE voice capability indicator may indicate that the UE does, or does not, support 5G emergency calls. In some examples, the UE voice capability indicator may be part of device radio capability information or other information provided by the UE to the 5G RAN 104 during network registration, for instance in an RRC message or another type of message, which the 5G RAN 104 passes on to the AMF 114 in the 5G core network 108.

At block 504, the AMF 114 can determine whether the UE supports 5G emergency calls via the 5G network, based on the UE voice capability indicator received at block 502. For example, the AMF 114 may determine whether the UE voice capability indicator received at block 502 is the UE voice capability indicator 204 discussed above with respect to FIG. 2 (indicating that the UE does support 5G emergency calls), or the UE voice capability indicator 304 discussed above with respect to FIG. 3 (indicating that the UE does not support 5G emergency calls).

If the AMF 114 determines at block 504, based on the UE voice capability indicator received at block 502, that the UE does support 5G emergency calls, the AMF 114 can instruct the UE at block 506 to make emergency calls via the 5G network. For example, at block 506, the AMF 114 can return an emergency call instruction 206 to the UE via the 5G RAN 104 as part of a network registration process, which can instruct the UE to use the 5G network for emergency calls as discussed above with respect to FIG. 2. In some examples, the AMF 114 can instruct, or configure, the UE to make emergency calls via the 5G network by providing an EMC indicator to the UE at block 506.

After instructing the UE to make emergency calls via the 5G network as part of a network registration process at block 506, the AMF 114 may later receive a service request associated with an emergency call from the UE at block 508. Because the AMF 114 provided the UE with an EMC indicator or other instruction to make emergency calls via the 5G network during an earlier network registration process, the service request received at block 508 can lack an emergency service fallback indicator.

At block 510, the AMF 114 and/or other elements of the 5G network can respond to the service request received at block 508, which lacks an emergency service fallback indicator, by setting up an emergency call for the UE via the 5G network. For example, the AMF 114 may cause session functions 116 in the 5G core network 108 to setup and manage a PDU session for the UE, request that the LMF 124 determine or estimate a location of the UE, cause the IMS 112 to establish and manage a communication session for the emergency call that routes data through the 5G core network 108, and/or initiate other call setup and management operations associated with the emergency call.

If the AMF 114 instead determines at block 504, based on the UE voice capability indicator received at block 502, that the UE does not support 5G emergency calls, the AMF 114 can instruct the UE at block 512 to make emergency calls via LTE emergency fallback procedures. For example, at block 516, the AMF 114 can return an emergency call instruction 306 to the UE via the 5G RAN 104 as part of a network registration process, which can instruct the UE to use the LTE emergency fallback procedures for emergency calls as discussed above with respect to FIG. 3. In some examples, the AMF 114 can instruct, or configure, the UE to make emergency calls via the LTE emergency fallback procedures by providing an EMF indicator to the UE at block 512.

After instructing the UE to make emergency calls via LTE emergency fallback procedures as part of a network registration process at block 512, the AMF 114 may later receive a service request associated with an emergency call from the UE at block 514. Because the AMF 114 provided the UE with an EMF indicator or other instruction to make emergency calls via the LTE emergency fallback procedures during an earlier network registration process, the service request received at block 514 can include an emergency service fallback indicator, such as the emergency service fallback indicator 310 discussed above with respect to FIG. 3.

At block 516, the AMF 114 and/or other elements of the 5G network can respond to the service request received at block 514, which includes an emergency service fallback indicator, by steering the UE to an LTE network for the emergency call. For example, the AMF 114 or the 5G RAN 104 may detect the presence of the emergency service fallback indicator in the service request received at block 514, and almost immediately return an LTE steering instruction 312 to the UE in response to the service request as discussed above with respect to FIG. 3. The UE can accordingly attempt the emergency call via the LTE network almost immediately after sending the service request to the 5G network, and the 5G network can avoid performing LCS operations and/or other call setup operations in response to the service request received at block 514.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method performed by a first telecommunication network, the method comprising:
   receiving, from a user equipment (UE), a network registration message comprising a UE voice capability indicator;
   determining, during a network registration process and based on the UE voice capability indicator, that the UE does not support emergency calls via the first telecommunication network;
   transmitting, during the network registration process and to the UE in response to the network registration message, an emergency call instruction that configures the UE to use second telecommunication network emergency fallback procedures,
   the emergency call instruction causing the UE to include an emergency service fallback indicator in a service request for an emergency call sent by the UE to the first telecommunication network;
   receiving the service request from the UE;
   in response to receiving the service request:
      refraining from performing call setup operations associated with the emergency call via the first telecommunication network; and
      steering the UE directly to a second telecommunication network for the emergency call, based on the emergency service fallback indicator in the service request,
   the first telecommunication network is a fifth generation (5G) telecommunication network, and
   the second telecommunication network is a Long-Term Evolution (LTE) telecommunication network.

2. The method of claim 1, wherein the emergency call instruction is a 3GPP emergency service fallback (EMF) indicator.

3. The method of claim 1, wherein the first telecommunication network supports emergency calls.

4. The method of claim 1, further comprising:
receiving, from a second UE, a second network registration message comprising a second UE voice capability indicator;
determining, based on the second UE voice capability indicator, that the second UE supports emergency calls via the first telecommunication network; and
transmitting, to the second UE in response to the second network registration message, a second emergency call instruction that configures the second UE to engage in emergency calls via the first telecommunication network,
wherein the second emergency call instruction causes the second UE to omit the emergency service fallback indicator in a second service request for a second emergency call sent by the second UE to the first telecommunication network.

5. The method of claim 4, wherein the second emergency call instruction is a 3GPP emergency service support (EMC) indicator.

6. The method of claim 4, further comprising:
receiving the second service request for the second emergency call; and
connecting the second emergency call for the second UE based on an absence of the emergency service fallback indicator in the second service request.

7. A network element of a first telecommunication network, comprising:
one or more processors; and
memory storing computer-executable instructions that, when executed by the one or more processors, cause the one or more processors to perform operations comprising:
receiving, from a user equipment (UE), a network registration message comprising a UE voice capability indicator;
determining during a network registration process, based on the UE voice capability indicator, that the UE does not support emergency calls via the first telecommunication network;
transmitting during the network registration process, to the UE in response to the network registration message, an emergency call instruction that configures the UE to use second telecommunication network emergency fallback procedures,
the emergency call instruction causing the UE to include an emergency service fallback indicator in a service request for an emergency call sent by the UE to the first telecommunication network;
receiving the service request from the UE;
in response to receiving the service request:
refraining from performing call setup operations associated with the emergency call via the first telecommunication network; and
steering the UE directly to a second telecommunication network for the emergency call, based on the emergency service fallback indicator in the service request,
the first telecommunication network is a fifth generation (5G) telecommunication network, and
the second telecommunication network is a Long-Term Evolution (LTE) telecommunication network.

8. The network element of claim 7, wherein the emergency call instruction is a 3GPP emergency service fallback (EMF) indicator.

9. The network element of claim 7, wherein the operations further comprise:
receiving, from a second UE, a second network registration message comprising a second UE voice capability indicator;
determining, based on the second UE voice capability indicator, that the second UE supports emergency calls via the first telecommunication network; and
transmitting, to the second UE in response to the second network registration message, a second emergency call instruction that configures the second UE to engage in emergency calls via the first telecommunication network,
wherein the second emergency call instruction causes the second UE to omit the emergency service fallback indicator in a second service request for a second emergency call sent by the second UE to the first telecommunication network.

10. The network element of claim 9, wherein the second emergency call instruction is a 3GPP emergency service support (EMC) indicator.

11. The network element of claim 9, wherein the operations further comprise:
receiving the second service request for the second emergency call; and
connecting the second emergency call for the second UE based on an absence of the emergency service fallback indicator in the second service request.

12. One or more non-transitory computer-readable media storing computer-executable instructions that, when executed by one or more processors of a network element of a first telecommunication network, cause the one or more processors to perform operations comprising:
receiving, from a user equipment (UE), a network registration message comprising a UE voice capability indicator;
determining during a network registration process, based on the UE voice capability indicator, that the UE does not support emergency calls via the first telecommunication network;
transmitting during the network registration process, to the UE in response to the network registration message, an emergency call instruction that configures the UE to use second telecommunication network emergency fallback procedures,
the emergency call instruction causing the UE to include an emergency service fallback indicator in a service request for an emergency call sent by the UE to the first telecommunication network;
receiving the service request from the UE;
in response to receiving the service request:
refraining from performing call setup operations associated with the emergency call via the first telecommunication network; and
steering the UE directly to a second telecommunication network for the emergency call, based on the emergency service fallback indicator in the service request,
the first telecommunication network is a fifth generation (5G) telecommunication network, and
the second telecommunication network is a Long-Term Evolution (LTE) telecommunication network.

13. The one or more non-transitory computer-readable media of claim 12, wherein the operations further comprise:

receiving, from a second UE, a second network registration message comprising a second UE voice capability indicator;

determining, based on the second UE voice capability indicator, that the second UE supports emergency calls via the first telecommunication network; and transmitting, to the second UE in response to the second network registration message, a second emergency call instruction that configures the second UE to engage in emergency calls via the first telecommunication network, wherein the second emergency call instruction causes the second UE to omit the emergency service fallback indicator in a second service request for a second emergency call sent by the second UE to the first telecommunication network.

14. The one or more non-transitory computer-readable media of claim 13, wherein the operations further comprise:

receiving the second service request for the second emergency call; and connecting the second emergency call for the second UE based on an absence of the emergency service fallback indicator in the second service request.

15. The method of claim 1, wherein determining, during the network registration process and based on the UE voice capability indicator, that the UE does not support emergency calls via the first telecommunication network includes:

determining, by an access and mobility management function (AMF) of the 5G telecommunication network during the network registration process.

16. The network element of claim 7, wherein the network element is an access and mobility management function (AMF) of the 5G telecommunication network.

17. The one or more non-transitory computer-readable media of claim 12, wherein the network element is an access and mobility management function (AMF) of the 5G telecommunication network.

\* \* \* \* \*